C. C. PARSONS.
HOSE-COUPLING.

No. 184,723. Patented Nov. 28, 1876.

Witnesses
Hiram Smith
Timothy Curtice

Inventor
C. C. Parsons

UNITED STATES PATENT OFFICE.

CHARLES C. PARSONS, OF NEW YORK, N. Y.

IMPROVEMENT IN HOSE-COUPLINGS.

Specification forming part of Letters Patent No. 184,723, dated November 28, 1876; application filed September 19, 1876.

*To all whom it may concern:*

Be it known that I, CHARLES C. PARSONS, of New York, in the county and State of New York, have invented a new and useful Improvement in Couplings for Joining Hose or Pipe, which improvement is fully set forth in the following specification, reference being had to the accompanying drawings.

The object of my invention is to make a coupling which shall be either male or female, as may be desired.

Figure 1:
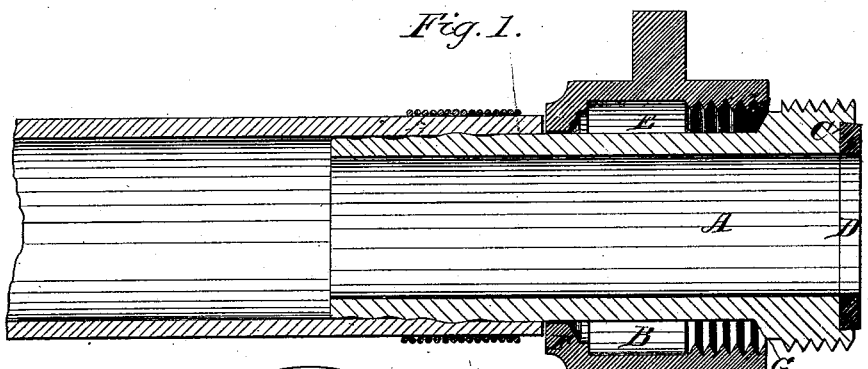
Figure 4:
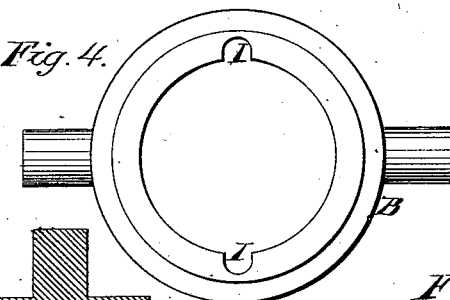
Figure 5:
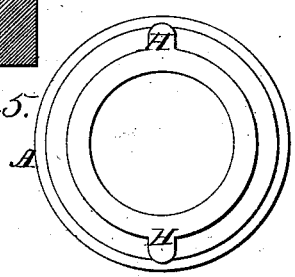
Figure 2:
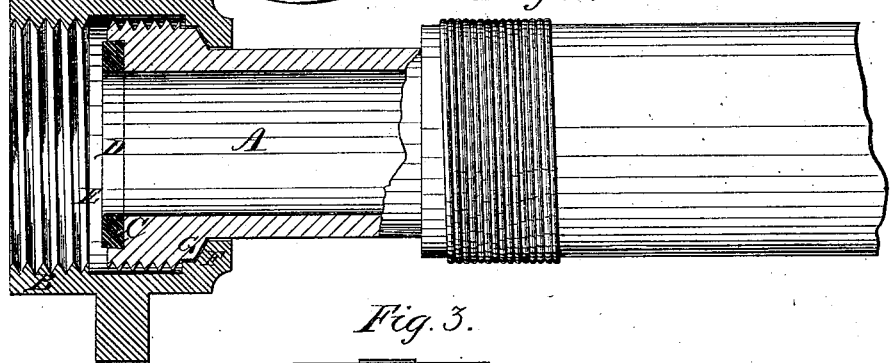
Figure 3:
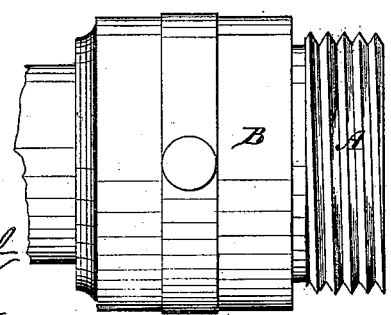

In the accompanying drawings, Figure 1 represents the coupling, with the female ring drawn back, so as to form an ordinary male coupling. Fig. 2 represents the coupling, with the same female ring pushed forward, so as to form an ordinary female coupling. Fig. 3 represents an external view of Fig. 1. Fig. 5 shows projections on the shank of the male portion of the coupling, fitting into suitable cavities or recesses in the female ring, as shown in Fig. 4, so that when the female ring is drawn back, as in Figs. 1 and 3, it will be kept from turning on the male portion.

This form of construction is only needed in large couplings, where it is necessary to use two wrenches or spanners in tightening the joint.

In the different figures the same letters refer to like parts.

A is the male portion of the coupling. B is the female portion of the coupling. C is a recess for containing the packing-ring, expanded in the inside so as to retain the packing ring D, and prevent it from falling out. E is a chamber in the rear part of the female coupling-ring, large enough to permit the ring to turn freely upon and over the screwed portion of the male coupling. F is the beveled portion of the female coupling, fitting and bearing upon G, a correspondingly-beveled portion of the male coupling. The object of this beveling is to make the couplings self-centering when tightened together. H H are projections on the shank of the male portion of the couplings, fitting into I I, corresponding recesses in the female portion of the coupling.

I have shown my improvement as applied to couplings connected by a screw-thread, as this is the most common form of construction.

It is obvious that any other form of coupling composed of a male and female portion, whether connected by cams, lugs, screws, or equivalent device, may have this improvement applied to them by lengthening the shank of the male portion and constructing the female portion so that it may be moved forward or back, as should be desired.

The couplings are drawn with ribs on the shank of the male portion, for attaching to hose; but they may be formed with a screw-thread, or otherwise, for metallic or wooden pipe.

I claim as my invention—

1. In a duplex coupling, the combination of the female ring B, having a recess or chamber in its rear large enough to permit the male portion A to turn freely within it, with a male part, A, lengthened so as to permit the female part to be drawn back upon it.

2. In combination with a duplex coupling, as above, the expanded recess E, to receive and retain the packing-ring D, the beveled bearing portions F and G, to make the coupling self-centering, and the lugs H and recesses I, to prevent the female part from turning upon the male part.

C. C. PARSONS.

Witnesses:
HIRAM SMITH,
TIMOTHY CURTIN.